(12) United States Patent
Lee et al.

(10) Patent No.: US 9,006,922 B2
(45) Date of Patent: Apr. 14, 2015

(54) POWER SUPPLY APPARATUS FOR ELECTRIC BICYCLE

(75) Inventors: Sanghoon Lee, Yongin-si (KR); Sungchae Hyun, Yongin-si (KR); Hwan Kim, Yongin-si (KR); Nohyun Kwag, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 770 days.

(21) Appl. No.: 13/244,101

(22) Filed: Sep. 23, 2011

(65) Prior Publication Data

US 2012/0153716 A1    Jun. 21, 2012

(30) Foreign Application Priority Data

Dec. 16, 2010 (KR) .......................... 10-2010-0128956

(51) Int. Cl.
| | | |
|---|---|---|
| *B60L 1/00* | (2006.01) | |
| *B60L 3/00* | (2006.01) | |
| *H02G 3/00* | (2006.01) | |
| *B60L 1/14* | (2006.01) | |
| *B60L 11/00* | (2006.01) | |
| *B60L 11/18* | (2006.01) | |

(52) U.S. Cl.
CPC ........... *B60L 11/007* (2013.01); *B60L 11/1822* (2013.01); *B60L 2200/12* (2013.01); *Y02T 10/7005* (2013.01); *Y02T 10/7072* (2013.01); *Y02T 90/124* (2013.01); *Y02T 90/14* (2013.01)

(58) Field of Classification Search
None
See application file for complete search history.

(56) References Cited

U.S. PATENT DOCUMENTS 3,793,497 A * 2/1974 Di Gaetano ................. 200/43.08
2010/0248008 A1* 9/2010 Sugawara et al. ............. 429/159

FOREIGN PATENT DOCUMENTS

| JP | 8-258770 A | 10/1996 |
| JP | 09-216588 A | 8/1997 |
| JP | 11-079065 A | 3/1999 |
| JP | 2001-006650 A | 1/2001 |
| JP | 2008-062814 A | 3/2008 |
| KR | 20-0216423 Y1 | 3/2001 |

OTHER PUBLICATIONS

Korean Notice of Allowance dated Jul. 27, 2012 for Korean Patent Application No. KR 10-2010-0128956 which corresponds to captioned U.S. Appl. No. 13/244,101.

* cited by examiner

*Primary Examiner* — Jared Fureman
*Assistant Examiner* — Aqeel Bukhari
(74) *Attorney, Agent, or Firm* — Knobbe, Martens, Olson & Bear, LLP

(57) ABSTRACT

A power supply apparatus for an electric bicycle is disclosed. The apparatus may include i) a battery pack and ii) a keybox connected to the battery pack and controlling on/off operations of the power supply apparatus. The keybox may further include i) a key set configured to receive a key cylinder that is moveable according to the rotation of a key inserted into the key box, ii) a contact terminal that includes a first plurality of sub-terminals, iii) a terminal base including at least one second sub-terminal connectable to and detachable from at least one of the first sub-terminals and iv) a keybox case configured to receive the key set, the contact terminal, and the terminal base. The terminal base may have a plate shape with a polygonal periphery surface at least part of which contacts an inner portion of the keybox case.

17 Claims, 6 Drawing Sheets

POWER SUPPLY APPARATUS FOR ELECTRIC BICYCLE

CROSS-REFERENCE TO RELATED APPLICATION

This application claims priority to and the benefit of Korean Patent Application No. 10-2010-00128956 filed on Dec. 16, 2010, in the Korean Intellectual Property Office, and entitled: "POWER SUPPLY APPARATUS FOR ELECTRIC BICYCLE" which is incorporated by reference herein in its entirety.

BACKGROUND

1. Field

The described technology generally relates to a power supply apparatus for an electric bicycle 2. Description of the Related Technology Electric bicycles, which include a battery and a motor, are widely used by people of all ages. The battery of an electric bicycle supplies power to a driving device of the electric bicycle. The driving device is generally installed on the front wheel of the electric bicycle, the upper middle portion of the electric bicycle, or the rear portion thereof. The driving device includes a starter switch that is located at a side portion of the battery to control the on/off operation of the battery.

SUMMARY

One inventive aspect is a power supply apparatus for an electric bicycle, which includes a keybox where a battery pack is electrically connected to a starter switch, to fix a contact between a terminal and a wire even when the key is inserted and rotated in the keybox, thereby reducing a resistance at the contact.

Another aspect is a power supply apparatus for an electric bicycle which includes: a battery pack including a plurality of bare cells and a protection circuit module electrically connected to the bare cells; a keybox connected to the battery pack through a wire to control on/off operations; and a case receiving the battery pack and the keybox, wherein the keybox includes: a key set receiving a key cylinder that is moved forward or rearward according to an operation of an inserted key; a contact terminal that is moved by a shaft adjacent to the key cylinder and includes connection parts having different polarities from each other; a terminal base including a terminal from which the connection part contacts or is removed to control the on/off operations; and a keybox case receiving the key set, the contact terminal, and the terminal base, wherein the terminal base has a plate shape with a polygonal periphery surface to contact an inner portion of the keybox case.

A portion of the terminal may protrude from a side of the terminal base and contacts the connection part of the contact terminal, and another portion of the terminal may protrude from another side of the terminal base and is connected to the battery pack. The terminal may be coupled through soldering to a wire connected to an electrode of the battery pack.

The terminal may have a polygonal side surface connected to the battery pack. The terminal may pass through the terminal base, and the terminal base may have a hole having at least one polygonal portion.

The connection part may be provided with a contact spring to be adjacent to a center of a rear surface thereof, and the contact spring may be fitted on the shaft.

The rear surface of the connection part may be adjacent to a plurality of contact springs.

The power supply apparatus may further include a polygonal fixing cover that fixes the terminal base.

The terminal base may be pentagonal or hexagonal. The power supply apparatus may further include a pentagonal or hexagonal fixing cover that fixes the terminal base. Another aspect is a power supply apparatus for an electric bicycle, comprising: a battery pack comprising a plurality of bare cells and a protection circuit module electrically connected to the bare cells; a keybox connected to the battery pack through a wire and configured to control on/off operations of the power supply apparatus; and a case configured to receive the battery pack and the keybox, wherein the keybox comprises: a key set configured to receive a key cylinder that is configured to move forward or backward according to the rotation of a key inserted into the key box; a contact terminal that is movable by a shaft adjacent to the key cylinder and includes a first plurality of sub-terminals having different polarities from each other; a terminal base including at least one second sub-terminal which is connectable to and detachable from at least one of the first sub-terminals so as to control the on/off operations; and a keybox case configured to receive the key set, the contact terminal, and the terminal base, wherein the terminal base has a plate shape with a polygonal periphery surface at least part of which contacts an inner portion of the keybox case.

In the above apparatus, a portion of the second sub-terminal protrudes from a first side of the terminal base and contacts at least one of the first sub-terminals, wherein another portion of the second sub-terminal protrudes from a second side of the terminal base and is connected to the battery pack, and wherein the first and second sides are opposing each other. In the above apparatus, the terminal is connected to an electrode of the battery pack via a wire. In the above apparatus, the second sub-terminal has a polygonal side surface connected to the battery pack. In the above apparatus, the second sub-terminal passes through the terminal base, and wherein the terminal base has a hole having at least one polygonal portion.

The above apparatus further comprises at least one contact spring formed on the shaft, wherein the contact spring is closer to the contact terminal than the terminal base. In the above apparatus, the first sub-terminals comprise a pair of sub-terminals, and wherein the at least one second sub-terminal comprises a pair of second sub-terminals which are connectable to and detachable from the first sub-terminals, respectively. The above apparatus further comprises a polygonal fixing cover configured to fixe the terminal base to the keybox case. In the above apparatus, the polygonal periphery surface of the terminal base is pentagonal or hexagonal. The above apparatus further comprises a pentagonal or hexagonal fixing cover configured to fixe the terminal base to the keybox case.

Another aspect is a power supply apparatus for an electric bicycle, comprising: a battery pack comprising a plurality of bare cells; a keybox connected to the battery pack and configured to control on/off operations of the power supply apparatus, wherein the keybox comprises: a movable contact terminal comprising a first pair of sub-terminals; and a terminal base comprising a second pair of sub-terminals which are connectable to and detachable from the first pair of sub-terminals so as to control the on/off operations, wherein the terminal base has a polygonal periphery surface at least part of which contacts an inner portion of the keybox case.

In the above apparatus, the keybox further comprises a key set configured to receive a key cylinder that is configured to move forward or backward according to the rotation of a key inserted into the key box. In the above apparatus, the keybox further comprises a keybox case configured to receive the key set, the contact terminal, and the terminal base. The above apparatus further comprises a polygonal fixing cover configured to fix the terminal base to the keybox case.

In the above apparatus, the contact terminal is movable by a shaft adjacent to the key cylinder. In the above apparatus, the first pair of sub-terminals have different polarities from each other, wherein the second pair of sub-terminals have different polarities from each other, wherein the first pair of sub-terminals are connected to the second pair of sub-terminals having the same polarities. In the above apparatus, each of the second pair of sub-terminals has a circular shape or a polygonal shape. In the above apparatus, the polygonal periphery surface of the terminal base is pentagonal or hexagonal.

Another aspect is a power supply apparatus for an electric bicycle, comprising: a battery pack comprising a plurality of bare cells; a keybox connected to the battery pack and configured to control on/off operations of the power supply apparatus; and a case configured to receive the battery pack and the keybox, wherein the keybox comprises: a key set configured to receive a key cylinder that is configured to move forward or backward according to the rotation of a key inserted into the key box; a movable contact terminal comprising at least one first sub-terminal; and a terminal base comprising at least one second sub-terminal which is connectable to and detachable from the first sub-terminal and the battery pack, wherein the terminal base has a polygonal perimeter, and wherein at least part of the terminal base engages an inner portion of the keybox to a sufficiently tight degree such that the terminal base does not move upon the rotation of the key.

In the above apparatus, the polygonal perimeter has a pentagonal or hexagonal shape.

DETAILED DESCRIPTION

Figure 1:
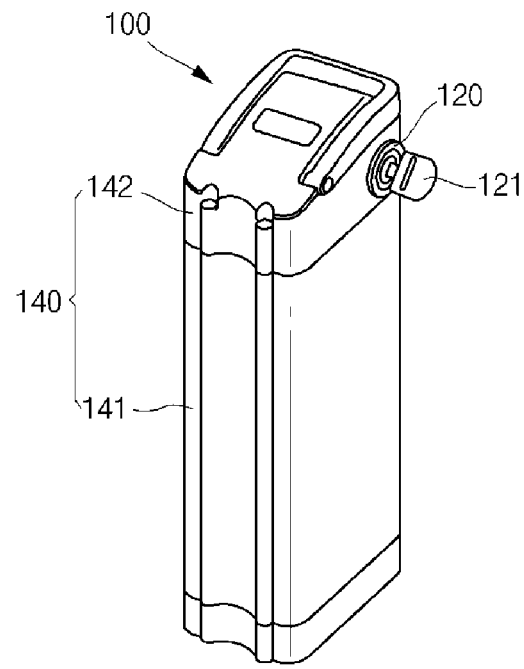
FIG. 1 is a perspective view illustrating a power supply apparatus for an electric bicycle according to an embodiment.

Generally, a starter switch for a battery driving device is used to perform a start-off operation or a start-on operation according to the rotation of a key. The starter switch typically includes a narrow land part that is exposed out of a terminal of a terminal base. The terminal base may rotate according to the rotation of the key. The rotation of the terminal base causes a defective contact between the terminal and the wire. When the terminal is used over a long period of time, the position on a housing is dislocated, and this decreases its reliability.

Hereinafter, embodiments will be described in detail with reference to the accompanying drawings.

Referring to FIGS. 1 through 6, a power supply apparatus 100 for an electric bicycle according to an embodiment includes a battery pack 110, a keybox 120, wires 130, and a case 140.

The power supply apparatus 100 supplies power to drive an electric bicycle. A key 121 is inserted into a side portion of the keybox 120 to control an on-off operation. A contact terminal 123 is connected to or detached from a terminal 127 according to the rotation of the inserted key 121, so that the keybox 120 can control power supply.

The battery pack 110 includes bare cells (not shown) and a protection circuit module (not shown), which are electrically connected to each other.

The bare cell includes an electrode assembly (not shown), a first electrode tab (not shown), and a second electrode tab (not shown). In one embodiment, the electrode assembly is formed by winding a negative electrode plate (not shown), a positive electrode plate (not shown), and a separator (not shown). The first electrode tab and the second electrode tab have different polarities from each other. The first and second electrode tabs are electrically connected to the positive electrode plate and the negative electrode plate, respectively. The bare cells of the power supply apparatus 100 are electrically connected to each other to output and store a large amount of electricity.

The keybox 120 includes a key set 122, the contact terminal 123, a keybox case 125, a case cover 126, the terminal 127, and a terminal base 128. The case cover 126 may include a fixing cover 129.

Figure 3:
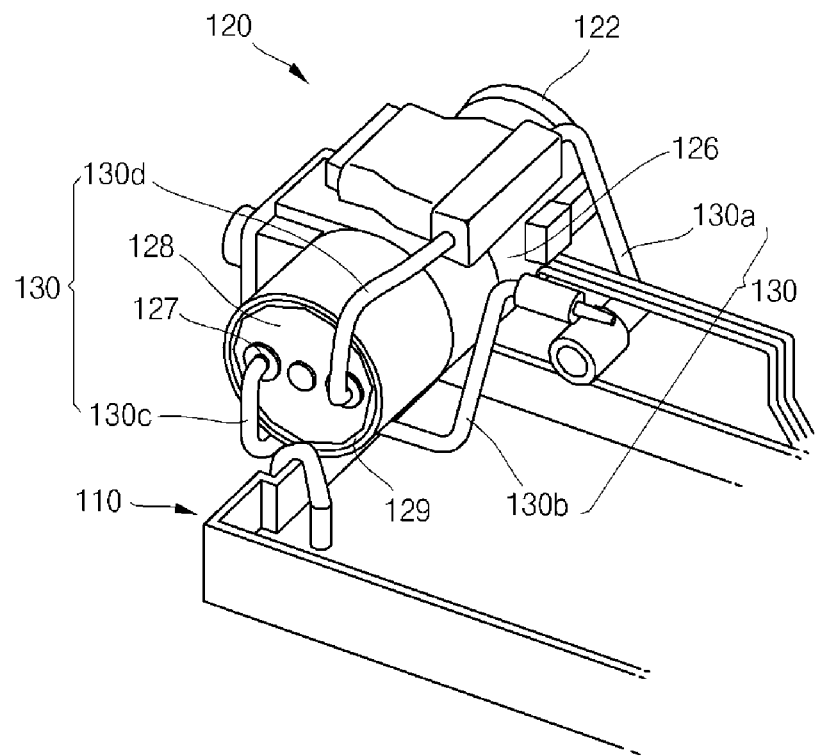
FIG. 3 is a perspective view illustrating the inner upper end of the power supply apparatus of FIG. 1.
Figure 4:
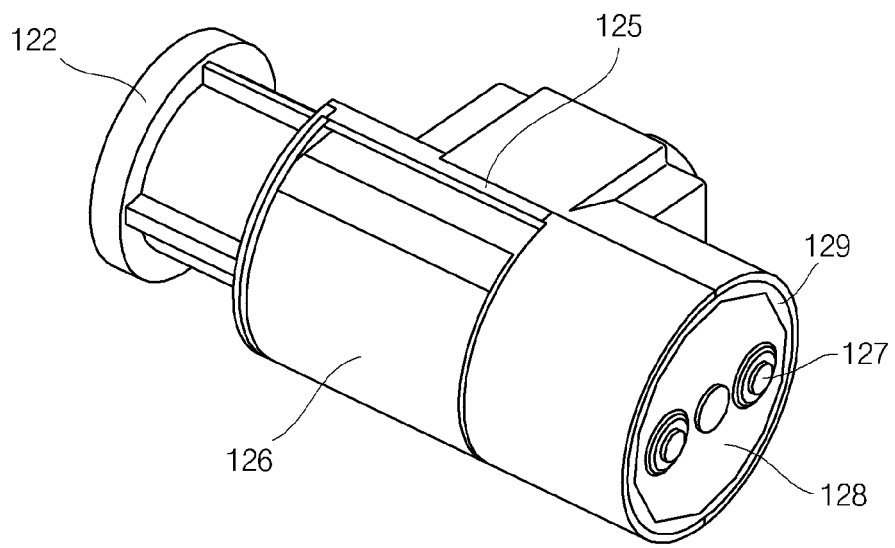
FIG. 4 is a perspective view illustrating a keybox of FIG. 3.
Figure 5:
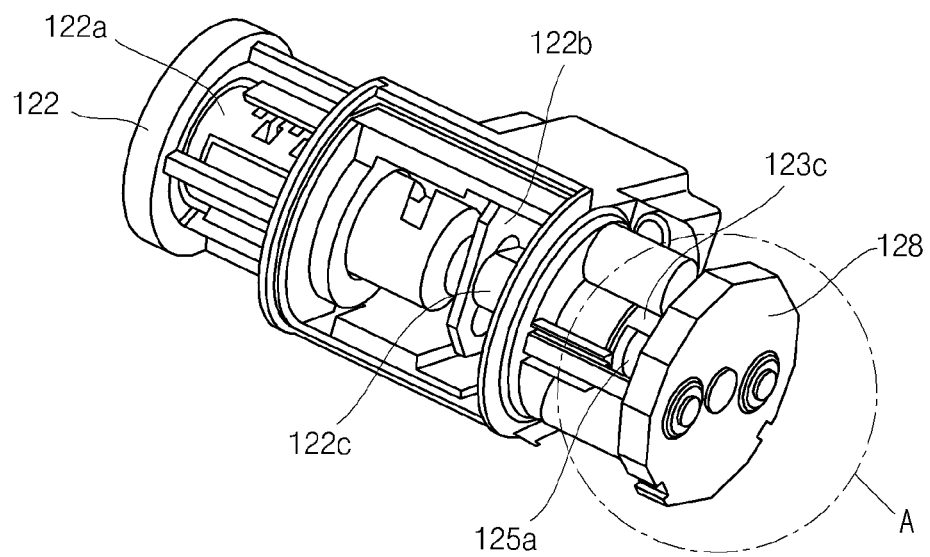
FIG. 5 is an exploded perspective view illustrating the keybox of FIG. 3.

In one embodiment, the keybox case 125 has an open front portion, an open rear portion, and a hollow middle portion. The case cover 126 covers the keybox case 125. The key set 122 for receiving the key 121 is disposed at the front side of the keybox case 125. A key cylinder 122a of the key set 122 moves forward or backward within the keybox case 125. The key cylinder 122a is spaced a predetermined distance from the contact terminal 123. The key 121 rotates to move the key cylinder 122a to the rear portion of the keybox case 125, and thus, the contact terminal 123 contacts a portion of the terminal 127. In one embodiment, the terminal base 128 has a polygonal periphery surface as shown in FIG. 5. The periphery surface of the terminal base 128 may have a pentagon, hexagon or other polygonal shape. This applies to the remaining embodiments. In one embodiment, as shown in FIG. 3, at least part of the periphery surface contacts an inner portion of the fixing cover 129. In one embodiment, the periphery surface sufficiently tightly contacts the inner portion of the fixing cover 129 so as to substantially prevent the terminal base 128 from moving even when the key 121 rotates. As a result, an increase of resistance at terminal contacts can be substantially prevented.

The key set 122 includes a key insertion recess (not shown) and the key cylinder 122a.

When the key 121 inserted into the key insertion recess (not shown) rotates in an on-direction (e.g., clockwise or counterclockwise), the key cylinder 122a moves to the rear portion of the keybox case 125. A protrusion (not shown) may be disposed at an end of the key cylinder 122a. The protrusion passes through a center hole (not shown) of a catching portion 122b to push an extension 122c. When the key 121 rotates in an off-direction (e.g., counterclockwise or clockwise), the key cylinder 122a moves to the front portion of the keybox case 125.

The key cylinder 122a may include pins (not shown) corresponding to the shape of the key 121, an inner cylinder (not shown), and an outer cylinder (not shown). When the key 121 is inserted into and rotated in the on-direction, the pins (not shown) unlock the key set 122. The key 121 is received in the center of the inner cylinder (not shown). The inner cylinder (not shown) may have a hole such that the pins (not shown) are inserted into a surface corresponding to the shape of the key 121. When the key 121 rotates in the on-direction, the outer cylinder (not shown) moves to the rear portion of the keybox case 125.

In one embodiment, the contact terminal 123 includes a hole 123b and connection portions (hereinafter to be interchangeably used with sub-terminals) 123a disposed at positions to contact the terminal 127 that is, for example, tetragonal or circular. The connection portions 123a may have a concave and convex shape according to the distance between the contact terminal 123 and the terminal 127. In one embodiment, the contact terminal 123 includes a pair of first sub-terminals having different polarities from each other. In one embodiment, the terminal 127 includes a pair of second sub-terminals having different polarities from each other. Each pair of the sub-terminals may have substantially the same function. The contact terminal 123 contacts the terminal 127 via the corresponding pairs of sub-terminals each having the same polarity.

The connection portion 123a contacts a first end of a shaft 125a. A second end of the shaft 125a is adjacent to the extension 122c. In one embodiment, the diameter of the hole 123b is smaller than that of the shaft 125a. When the extension 122c pushes the second end of the shaft 125a, the shaft 125a is not removed from the hole 123b, and thus, the contact terminal 123 moves. Guide recesses (not shown) may be disposed at the upper and lower sides of the contact terminal 123. The guide recesses (not shown) prevent a removal of the contact terminal 123. Bars 123e are fixed at both ends of the contact terminal 123, and move along recesses 123d disposed in the keybox case 125. When the extension 122c pushes the second end of the shaft 125a, the contact terminal 123 moves along the recesses 123d and contacts the front surface of the terminal 127.

Figure 6:
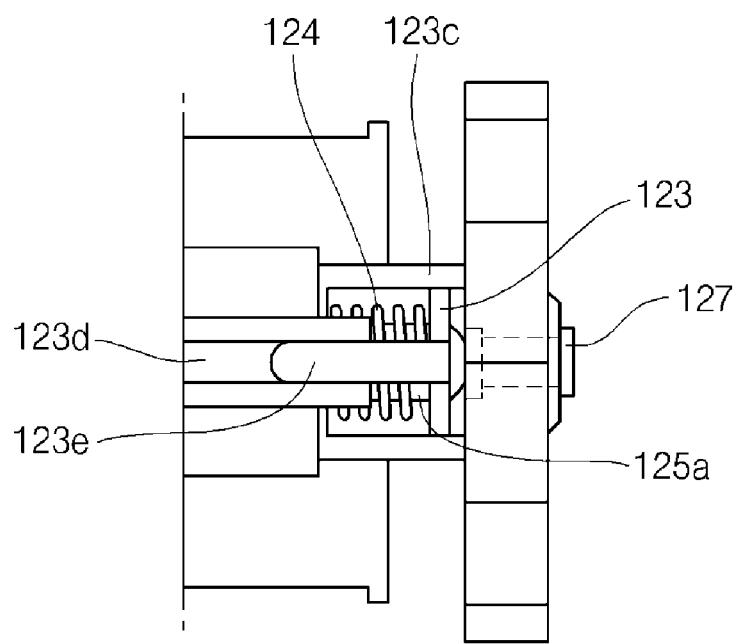
FIG. 6 is a side view illustrating a portion A of FIG. 5.
Figure 7:
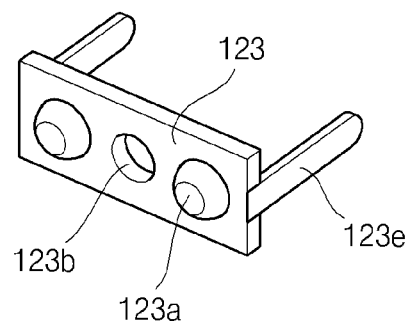
FIG. 7 is a perspective view illustrating a contact terminal of FIG. 3.

Referring to FIG. 6, a contact spring 124 is fitted on the shaft 125a. A portion of the contact spring 124 is fixed to the keybox case 125. When the shaft 125a moves the contact terminal 123 to the terminal 127, the contact spring 124 maximally extends. At this point, the contact terminal 123 contacts the terminal 127. On the contrary, when the key 121 rotates in the off-direction, the shaft 125a moves away from the terminal 127. At this point, the contact terminal 123 is detached from the terminal 127 by resilient force of the maximally extended contact spring 124. At this point, the contact spring 124 corresponds to rear surfaces of the recesses 123d.

The terminal 127 is disposed within the keybox case 125, and is formed at a position corresponding to the rear surface of the contact terminal 123. The terminal 127 protrudes out of the keybox case 125 and is electrically connected to the battery pack 110.

In one embodiment, the terminal base 128 has a plate shape with a polygonal periphery surface. The terminal base 128 includes the terminal 127 at a position corresponding to the contact terminal 123. The polygonal terminal base 128 is fixed to the keybox case 125 to maintain a constant contact resistance at the terminal 127.

Figure 2:
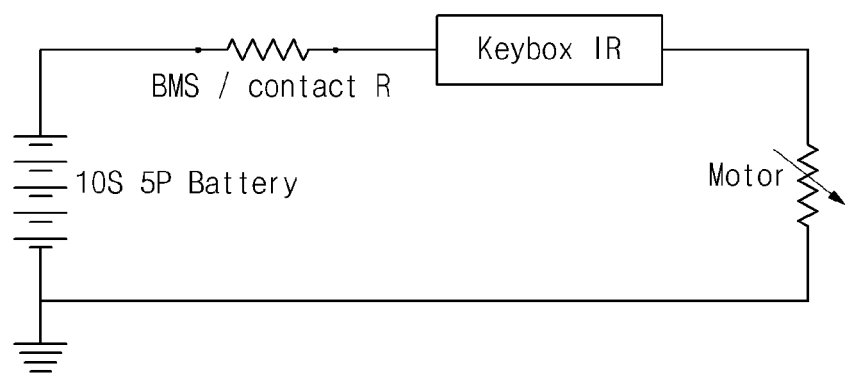
FIG. 2 is a circuit diagram illustrating an operation of the power supply apparatus of FIG. 1.

Referring to FIG. 2, when the key 121 rotates in the on-direction, the resistance value of a contact of the terminal 127 affects the resistance value of the battery pack 110. When the terminal base 128 rotates according to the rotation of the key 121, the contact resistance of the keybox 120 varies, and thus, inner resistance values are uneven, and the dispersion of inner resistances are increased. Thus, the terminal base 128 is substantially fixed to maintain a substantially constant contact resistance, and the life of the battery pack 110 is increased.

Table 1 shows a discharge time and an operation time when an inner resistance value increases in FIG. 2.

TABLE 1

| Keybox × IR | Discharge Time (SOC = 0%) | Operation Time (28 V cut off) |
| --- | --- | --- |
| 0 mΩ | 6290[s] | 6130[s] |
| 100 mΩ | 6170[s] | 5950[s] |
| 230 mΩ | 6010[s] | 5680[s] |
| 300 mΩ | 5920[s] | 5520[s] |

As shown in Table 1, when the inner resistance (Keybox× IR) increases, the discharge time and the operation time are decreased.

The case cover 126 includes the fixing cover 129. In one embodiment, the inner portion of the fixing cover 129 has a polygonal shape that is substantially the same as the shape of the terminal base 128. Thus, the fixing cover 129 contacts the periphery of the terminal base 128. Since the fixing cover 129 prevents the rotation of the terminal base 128 due to the rotation of the key 121, the resistance at the contact of the terminal 127 is decreased.

The wires 130 include wires 130a, 130b, 130c, and 130d. The wire 130 contacts the rear surface of the terminal 127, and thus, is electrically connected to the battery pack 110.

If the terminal base 128 rotates, the contact resistance at the contact where the terminal 127 is connected to the wire 130c varies, and thus, an inner resistance value is uneven. Thus, according to the current embodiment, the contact between the wire 130c and the terminal 127 may be substantially fixed to decrease a resistance value.

The case 140 includes a case body 141 and an upper case 142. The case body 141 receives the battery pack 110. The upper case 142 has a hole (not shown) to insert the key 121 into the key box 120.

Figure 8A:
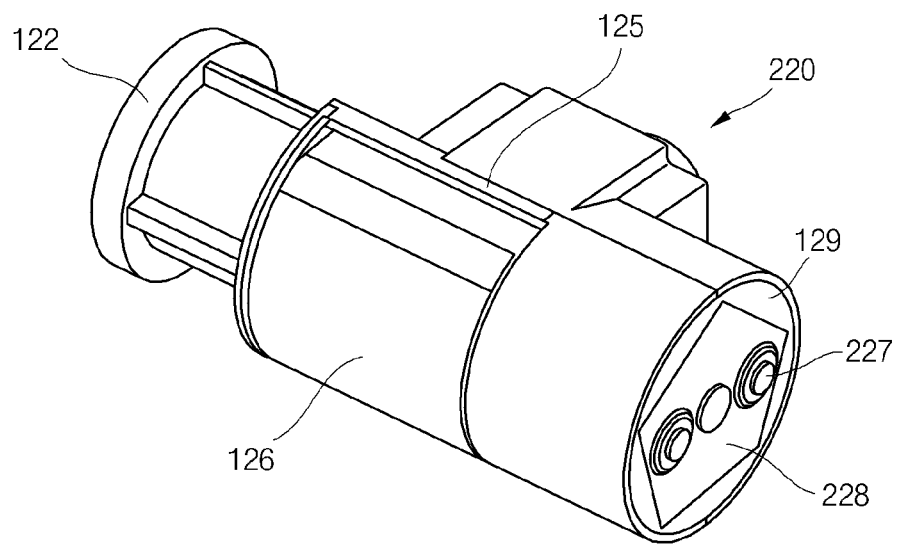
FIG. 8A is a perspective view illustrating a keybox according to another embodiment.

FIG. 8A is a perspective view illustrating a keybox 220 according to another embodiment.

In one embodiment, as shown in FIG. 8A, the keybox 220 includes a terminal base 228 that is pentagonal. The power supply apparatus according to the current embodiment will now be described with respect to the terminal base 228. In addition, like reference numerals denote like elements in the current embodiment and the previous one of FIGS. 1 through 6, and detailed descriptions thereof will be omitted here.

In one embodiment, the terminal base 228 has a plate shape with a pentagonal periphery surface. The periphery surface of the terminal base 228 contacts the inner portion of the fixing cover 129 and is fixed. The terminal base 228 may substantially uniformly maintain the contact resistance between a terminal 227 and the wire 130. In this case, the fixing cover 129 may have a pentagonal shape that is substantially the same as the shape of the terminal base 228.

Figure 8B:
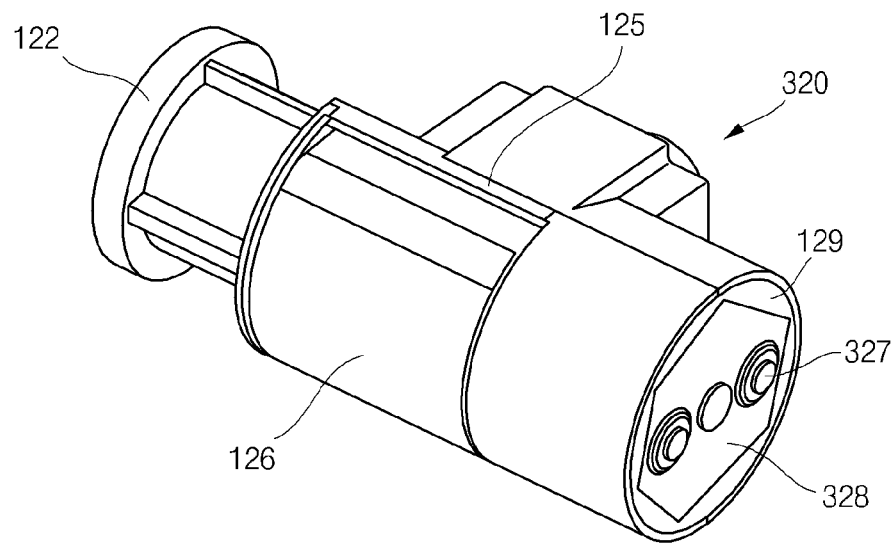
FIG. 8B is a perspective view illustrating a keybox according to another embodiment.

FIG. 8B is a perspective view illustrating a keybox 320 according to another embodiment. In one embodiment, as shown in FIG. 8B, the keybox 320 includes a terminal base 328 that is hexagonal. Thus, the power supply apparatus according to the current embodiment will now be described with respect to the terminal base 328. In addition, like reference numerals denote like elements in the current embodiment and the previous ones of FIGS. 1 through 7, and detailed descriptions thereof will be omitted here.

In one embodiment, the terminal base 328 has a plate shape with a hexagonal periphery surface. The periphery surface of the terminal base 328 contacts the inner portion of the fixing cover 129. The terminal base 328 may substantially uniformly maintain the contact resistance between a terminal 327 and the wire 130. In this case, the fixing cover 129 may have a hexagonal shape that is substantially the same as the shape of the terminal base 328.

Figure 9:
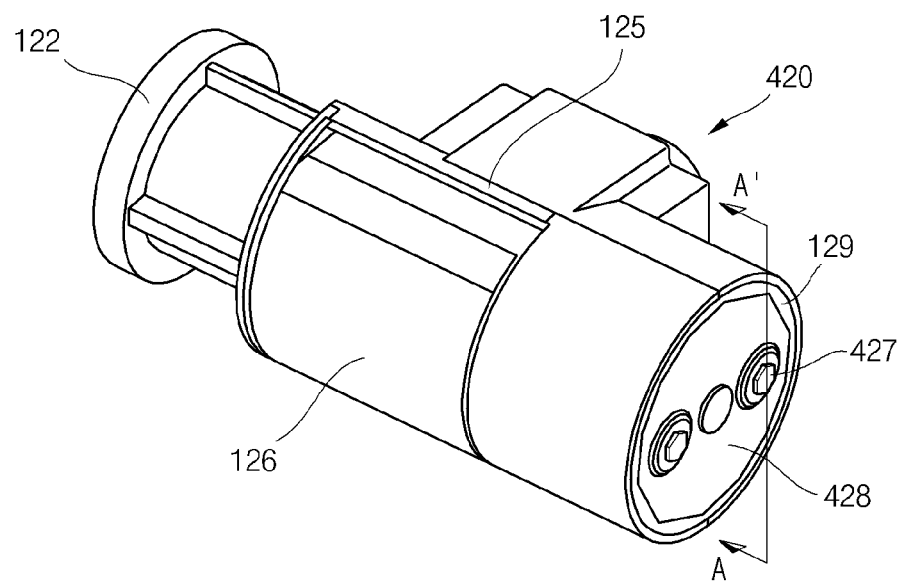
FIG. 9 is a perspective view illustrating a keybox according to another embodiment.
Figure 10:
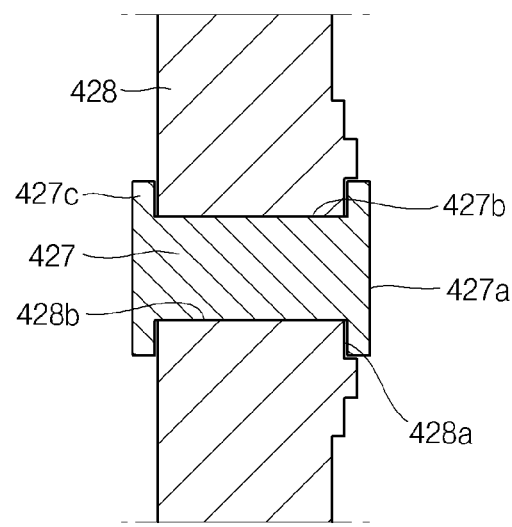
FIG. 10 is a cross-sectional view taken along line A-A' of FIG. 9.
Figure 11:
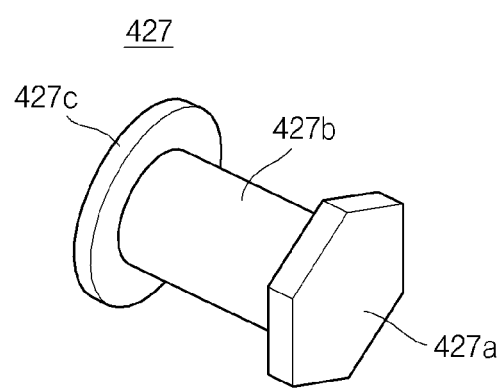
FIG. 11 is a perspective view illustrating a terminal of FIG. 9.

FIG. 9 is a perspective view illustrating a keybox 420 according to another embodiment. FIG. 10 is a cross-sectional view taken along line A-A' of FIG. 9. FIG. 11 is a perspective view illustrating a terminal of FIG. 9. A power supply apparatus according to the current embodiment includes the battery pack 110, the keybox 420, the wires 130, and the case 140. In one embodiment, as shown in FIGS. 10 and 11, the keybox 420 includes a terminal 427 has a polygonal portion. Thus, the power supply apparatus according to the current embodiment will now be described with respect to the terminal 427. In addition, like reference numerals denote like elements in the current embodiment and the previous ones of FIGS. 1 through 8B, and detailed descriptions thereof will be omitted here.

The terminal 427 includes a wire contact 427a, a body 427b, and a terminal contact 427c. The terminal 427 passes through the terminal base 428. In one embodiment, the terminal base 428 has a hole 428a that has at least one polygonal portion. The hole 428a has substantially the same shape as that of the wire contact 427a. The hole 428a prevents the movement of the terminal 427 due to the rotation of the key 121 or external force.

Although the wire contact 427a is polygonal in the current embodiment, the body 427b and the terminal contact 427c may be circular or polygonal in another embodiment. A through central portion 428b of the terminal base 428 may have a shape corresponding to the shape of the body 427b.

Table 2 shows inner resistance values of the keybox 420.

TABLE 2

| Inner Resistance at Contact | Experimental Example (mΩ) | Comparison Example (mΩ) |
|---|---|---|
| Mean Value | 8 | 37 |
| Standard Deviation | 2 | 37 |
| Maximum Value | 15 | 201 |
| Minimum Value | 6 | 7 |
| Range | 9 | 194 |
| Number of times of measuring | 100 | 96 |

A terminal base and a terminal of the comparison example are circular. In the comparison example, the terminal base rotates (moves) to vary a contact resistance of the terminal, and thus, the inner resistance values are uneven.

Thus, according to the current embodiment, since the contact is substantially fixed, the inner resistance values can be decreased, and a substantially uniform contact resistance can be maintained.

According to one embodiment, the rotation of the terminal base is prevented even when the key rotates, the resistance at the contact between the terminal and the wire is decreased, thereby increasing the life of the battery pack.

According to at least one of the disclosed embodiments, since the shape of the terminal base and the shape of the terminal are improved, the coupling force with the wire can be improved.

Embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the following claims.

What is claimed is:

1. A power supply apparatus for an electric bicycle, comprising:
    a battery pack comprising a plurality of bare cells and a protection circuit module electrically connected to the bare cells;
    a keybox connected to the battery pack through a wire and configured to control on/off operations of the power supply apparatus; and
    a case configured to receive the battery pack and the keybox,
    wherein the keybox comprises:
    a key set configured to receive a key cylinder that is configured to move forward or backward according to the rotation of a key inserted into the key box;
    a contact terminal that is movable by a shaft adjacent to the key cylinder and includes a first plurality of sub-terminals having different polarities from each other;
    a terminal base including at least one terminal which is connectable to and detachable from the sub-terminals so as to control the on/off operations;
    a keybox case configured to receive the key set, the contact terminal, and the terminal base; and
    a fixing cover configured to fix the terminal base to the keybox case, wherein the terminal base has a plate shape with a polygonal periphery surface at least part of which contacts an inner portion of the fixing cover.

2. The power supply apparatus as claimed in claim 1, wherein a portion of the terminal protrudes from a first side of the terminal base and contacts the sub-terminals, wherein another portion of the terminal protrudes from a second side of the terminal base and is connected to the battery pack, and wherein the first and second sides are opposing each other.

3. The power supply apparatus as claimed in claim 2, wherein the terminal is connected to an electrode of the battery pack via a wire.

4. The power supply apparatus as claimed in claim 2, wherein the terminal has a polygonal side surface connected to the battery pack.

5. The power supply apparatus as claimed in claim 4, wherein the terminal passes through the terminal base, and wherein the terminal base has a hole having at least one polygonal portion.

6. The power supply apparatus as claimed in claim 2, further comprising at least one contact spring formed on the shaft, wherein the contact spring is closer to the contact terminal than the terminal base.

7. The power supply apparatus as claimed in claim 6, wherein the at least one terminal comprises a pair of terminals having different polarities from each other which are connectable to and detachable from the sub-terminals, and wherein the terminals are connected to the sub-terminals having the same polarities.

8. The power supply apparatus as claimed in claim 1, wherein the polygonal periphery surface of the terminal base is pentagonal or hexagonal.

9. The power supply apparatus as claimed in claim 8, wherein the inner portion of the fixing cover is pentagonal or hexagonal.

10. A power supply apparatus for an electric bicycle, comprising:
    a battery pack comprising a plurality of bare cells;

a keybox connected to the battery pack and configured to control on/off operations of the power supply apparatus, wherein the keybox comprises:
  a movable contact terminal comprising a pair of sub-terminals;
  a terminal base comprising a pair of terminals which are connectable to and detachable from the pair of sub-terminals so as to control the on/off operations;
  a keybox case configured to receive the contact terminal, and the terminal base; and
  a fixing cover configured to fix the terminal base to the keybox case, wherein the terminal base has a plate shape with a polygonal periphery surface at least part of which contacts an inner portion of the fixing cover.

11. The power supply apparatus as claimed in claim 10, wherein the keybox further comprises a key set configured to receive a key cylinder that is configured to move forward or backward according to the rotation of a key inserted into the key box.

12. The power supply apparatus as claimed in claim 10, wherein the contact terminal is movable by a shaft adjacent to the key cylinder.

13. The power supply apparatus as claimed in claim 10, wherein the pair of sub-terminals have different polarities from each other, wherein the pair of terminals have different polarities from each other, and wherein the pair of sub-terminals are connected to the pair of terminals having the same polarities.

14. The power supply apparatus as claimed in claim 10, wherein each of the terminals has a pentagonal shape or a hexagonal shape.

15. The power supply apparatus as claimed in claim 10, wherein the polygonal periphery surface of the terminal base is polygonal.

16. A power supply apparatus for an electric bicycle, comprising:
  a battery pack comprising a plurality of bare cells;
  a keybox connected to the battery pack and configured to control on/off operations of the power supply apparatus; and
  a case configured to receive the battery pack and the keybox, wherein the keybox comprises:
  a key set configured to receive a key cylinder that is configured to move forward or backward according to the rotation of a key inserted into the key box;
  a movable contact terminal comprising at least one first sub-terminal;
  a terminal base comprising at least one second sub-terminal which is connectable to and detachable from the first sub-terminal and the battery pack;
  a keybox case configured to receive the key set, the contact terminal, and the terminal base; and
  a fixing cover configured to fix the terminal base to the keybox case, wherein the terminal base has a polygonal perimeter, and wherein at least part of the terminal base engages an inner portion of the fixing cover to a sufficiently tight degree such that the terminal base does not move upon the rotation of the key.

17. The power supply apparatus as claimed in claim 16, wherein the polygonal perimeter has a pentagonal or hexagonal shape.

* * * * *